United States Patent [19]

Dudley

[11] 4,391,447
[45] Jul. 5, 1983

[54] ELECTRONIC CHESS GAME

[76] Inventor: Raymond Dudley, 833 S. Cedros, Apt. 24, Solana Beach, Calif. 92075

[21] Appl. No.: 208,781

[22] Filed: Nov. 20, 1980

[51] Int. Cl.³ .............................................. G09B 19/22
[52] U.S. Cl. ..................................... 273/238; 434/128
[58] Field of Search ....................... 273/238, 260, 237; 434/128; 369/410, 411; 340/323 R

[56] References Cited

U.S. PATENT DOCUMENTS

| | | | |
|---|---|---|---|
| 927,538 | 7/1909 | Nelson | 273/238 |
| 2,679,397 | 5/1954 | Thacker | 273/136 |
| 2,799,505 | 7/1957 | Lyons | 273/136 |
| 3,223,419 | 12/1965 | Isaacs et al. | 273/131 |
| 3,654,392 | 4/1972 | Beinhocker et al. | 179/2 |
| 3,683,363 | 8/1972 | Khlebutin | 340/323 |
| 3,739,117 | 6/1973 | Melton | 200/61.1 |
| 3,760,404 | 9/1973 | Khlebutin | 340/323 |
| 3,802,708 | 4/1974 | Libert | 273/136 |
| 3,843,132 | 10/1974 | Ferguson | 273/238 |
| 3,854,725 | 12/1974 | Cluck | 273/121 |
| 3,888,491 | 6/1975 | Bernard et al. | 273/136 |
| 3,893,671 | 7/1975 | Gardner | 273/136 |
| 3,923,306 | 12/1975 | Cahn-Hidalgo et al. | 273/136 |
| 3,977,682 | 8/1976 | Aida | 273/136 |
| 4,036,500 | 7/1977 | Kiernan | 273/130 |
| 4,073,067 | 2/1978 | Beach | 35/8 |
| 4,082,285 | 4/1978 | Bathurst | 273/237 |

Primary Examiner—Vance Y. Hum
Assistant Examiner—Leo P. Picard
Attorney, Agent, or Firm—Shapiro and Shapiro

[57] ABSTRACT

An electronic game for positional games such as chess comprises a playing board and a plurality of playing pieces, each piece being movable between playing positions on the playing board in accordance with a predetermined pattern which is influenced by the locations of other playing pieces. Each playing piece is encoded in accordance with its identity, and each playing position automatically responds to the encoding when it is occupied by a playing piece. An electrical circuit associated with the playing position causes other positions to which the playing piece is capable of moving to be illuminated with an appropriate color. Each playing piece includes light sources which are illuminated when the playing piece is in jeopardy of being captured by an opposing playing piece or is covered by a friendly playing piece. The intensity of attack and the depth of cover may also be indicated. The playing pieces are automatically oriented in a predetermined manner when they are placed on a playing position in order to establish electrical contact between electrical terminals on the base of the playing piece and electrical terminals on the playing position.

25 Claims, 15 Drawing Figures

ELECTRONIC CHESS GAME

BACKGROUND OF THE INVENTION

This invention relates generally to electronic games, and more particularly to electronic games which are useful as teaching devices.

Electronic games which provide visual aids to the players to assist them in their decision making are useful for teaching the fundamentals of positional games, such as chess, checkers, etc., to inexperienced players, or for assisting more experienced players in improving their game. A particularly useful teaching device for positional games is one which provides a visual indication to the players of their possible moves. For example, U.S. Pat. No. 3,893,671 to Gardner discloses a chess game comprising a chessboard having a socket on each square thereof into which the various chesspieces are plugged as they are moved on the board. A plurality of optical fibers interconnect the 64 squares of the chessboard, and each chesspiece contains a light source for directing light through a mask comprising a plurality of openings located in a predetermined pattern on the base of the chesspiece. The pattern of openings, which encodes each chesspiece according to its type, directs the light into selected ones of the optical fibers to illuminate the squares on the chessboard to which the chesspiece is capable of moving. The Gardner device, however, does not take into consideration the positions of other playing pieces on the board, which influence the manner in which some chesspieces are able to move.

U.S. Pat. No. 2,679,397 to Thacker discloses another chess game in which squares that are under attack or which are defended by one or more chesspieces are illuminated. However, the Thacker device provides a bank of 64 switches for each player which must be manipulated in order to illuminate the squares.

Generally, known positional electronic games, particularly for chess, which is a rather sophisticated positional game, possess one or more significant disadvantages. They tend to be either overly complicated, both in terms of structure and in terms of operation, or to be overly simplistic and lack flexibility or usefulness as a teaching device.

SUMMARY OF THE INVENTION

The present invention overcomes these and other disadvantages of the prior art by providing an electronic game apparatus for positional games, such as chess, which provides a visual indication to the players of the possible moves for each playing piece on a playing board, considering the locations of other playing pieces on the board. In addition, the invention is capable of providing visual indications of the jeopardy in which a playing piece is placed due to the locations of opposing pieces and the cover or protection afforded to the playing piece due to the locations of friendly pieces. Moreover, the electronic game of the invention operates completely automatically, responding to the locations of the playing pieces on the board without requiring the operation of external switches, etc. Accordingly, the players need only to manipulate the playing pieces in the usual manner and are free to concentrate on the game.

Briefly, in accordance with one aspect of the invention, an electronic game is provided which comprises a playing board defining a plurality of playing positions, and a plurality of playing pieces divided into groups of opposing pieces representing opposing players, each piece being movable in accordance with a predetermined pattern between playing positions, the predetermined pattern being influenced by the locations of other pieces on the board. Each playing piece is encoded and each playing position on the board includes means responsive to the encoding for detecting the presence of a piece located at that position. Means responsive to the detecting means illuminates each position on the board to which the piece is capable of being moved, considering the locations of other pieces on the board.

In accordance with another aspect, the invention provides an electronic game comprising a playing board defining a plurality of playing positions, and a plurality of playing pieces divided into groups of opposing pieces representing opposing players, each piece being movable in accordance with a predetermined pattern between playing positions and being capable of capturing an opposing piece located on a position to which the piece is moved, the predetermined pattern being influenced by the locations of other pieces on the board. Each playing piece is encoded according to its group membership and each position includes means responsive to the encoding for detecting the presence of and the group membership of a piece located at that position. Means responsive to the detecting means illuminates each piece according to the jeopardy in which the piece is placed due to the locations of opposing pieces.

In accordance with yet another aspect, a playing board for an electronic game is provided which includes first electrical circuit means for detecting the positions on the board which are occupied by a playing piece and for identifying the group membership of the piece located at each occupied position. Second electrical circuit means, responsive to the first electrical circuit means, determines the possible moves that each piece can make, considering the locations of the other pieces, and means responsive to the second electrical circuit means are provided for indicating the possible moves.

In accordance with still another aspect, the invention provides a game comprising a playing piece and a playing board defining a plurality of playing positions to which the playing piece may be moved. First magnetic means are located in each of the playing positions on the playing board, and second magnetic means are located in the base of the playing piece. The first and second magnetic means are cooperable to orient the playing piece in a predetermined manner at each playing position to which the playing piece is moved.

DESCRIPTION OF THE PREFERRED EMBODIMENT

The present invention is applicable to positional games, such as chess, checkers, etc., in which opposing players move their respective playing pieces in accordance with predetermined patterns, as defined by the rules of the game, between playing positions on a playing board. The invention is particularly applicable to the game of chess and will be described in that environment. However, the principles of the invention are also applicable to other positional games, as will become apparent from the following description. Prior to presenting a detailed description of the invention, a brief overview of the game of chess and the manner in which the invention operates will be given in order to facilitate an understanding of the invention from the description which follows.

As is well known, the rules of chess prescribe the manner in which each of the different types of chesspieces can move between the playing positions, i.e., squares, of the chessboard, and each type of chesspiece has a different predetermined movement pattern. For example, rooks may move horizontally or vertically; bishops may move diagonally; and queens may move horizontally, vertically or diagonally. These pieces may be referred to as "positional chesspieces", i.e., their movement patterns are governed by the positions of other chesspieces on the board, and the number of positions, i.e., squares, which they may move varies with the locations of the other pieces. Positional chesspieces cannot pass a blocking chesspiece, i.e., any chesspiece placed in its row or rank. They may attack (capture) or cover (protect) a blocking chesspiece, but they cannot jump a blocking chesspiece and extend their power beyond it. On the other hand, the movement patterns of kings, pawns, and knights, which may be referred to as "fixed chesspieces", are not dependent on the locations of other chesspieces on the board but are fixed. Knights, for example, may jump blocking chesspieces. A chesspiece is captured when an opposing chesspiece moves onto the square occupied by the chesspiece. A chesspiece is under attack when it is located on a square to which an opposing chesspiece is capable of moving, and it is covered or protected when it is located on a square to which a friendly chesspiece is capable of moving.

The invention provides visual information to the players to assist them in their decision making during the game. Specifically, the possible moves of each chesspiece are indicated by illuminating all of the squares to which the chesspiece may be moved. With respect to the possible moves of the positional chesspieces, the invention considers the locations of other chesspieces, both friendly and opposing and both positional and fixed, and indicates the possible moves of the positional chesspieces accordingly. Different color light sources (red and green) are used to indicate the possible moves of opposing chesspieces, i.e., those belonging to opposing players.

In addition, within each chesspiece are different color light sources which are controlled by the illumination of the position on which the chesspiece is located. Therefore, when a chesspiece is under attack and in jeopardy of being captured by virtue of being located on a playing position to which an opposing chesspiece may move, the light source within the chesspiece which represents the color of the opposing piece is illuminated, providing the players with a visual indication of the jeopardy of the chesspiece. If the playing position occupied by the chesspiece is one to which a friendly chesspiece may move, the chesspiece is covered or protected and its light source which represents the color of its own group will be illuminated. Accordingly, the players are able to see readily the possible moves which are available to them, which of their chesspieces is under attack, and which of their chesspieces is covered.

As will be described later, the invention also indicates to the players the intensity of the attack and the depth of cover or protection. Moreover, the invention operates automatically, responding to the physical locations of the chesspieces themselves, and does not require that the players manipulate external switches or input their moves into a keyboard. The players are, therefore, free to concentrate on the game. This is a significant advantage of the invention. A preferred form of the invention which embodies the abovementioned and other advantages will now be described.

Figure 1:
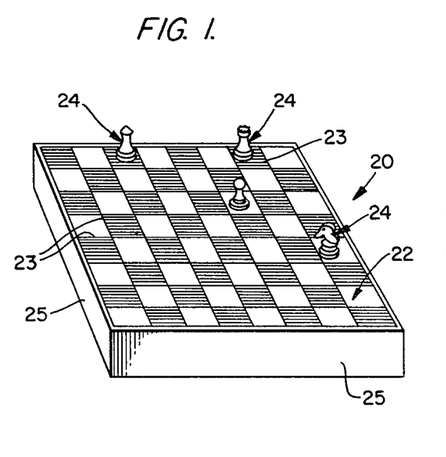
FIG. 1 is a perspective view of a chess game embodying the invention.

FIG. 1 illustrates a chess game 20 embodying the invention. As shown, the chess game comprises a well-known playing board or chessboard 22 divided into sixty-four squares 23 of alternating colors, eight squares to a side, and a plurality of playing pieces or chesspieces 24 (which are divided into two groups identified by different colors representing opposing players), each chesspiece capable of moving in a predetermined manner on the chessboard between the squares. The chessboard 22, which is preferably translucent, is provided with sides 25 to form an enclosure for housing the various electronic circuits of the invention, which will be described in detail shortly. As will also be described shortly, each chesspiece is encoded according to its group membership, i.e., by color, and according to its type, i.e., rock, bishop, pawn, etc. Associated with each square 23 of the chessboard are a plurality of electronic circuits which detect the presence, type and group membership of a chesspiece located on the square, and which control the illumination of the squares on the chessboard and the chesspieces themselves, in the manner previously mentioned.

Figure 2:
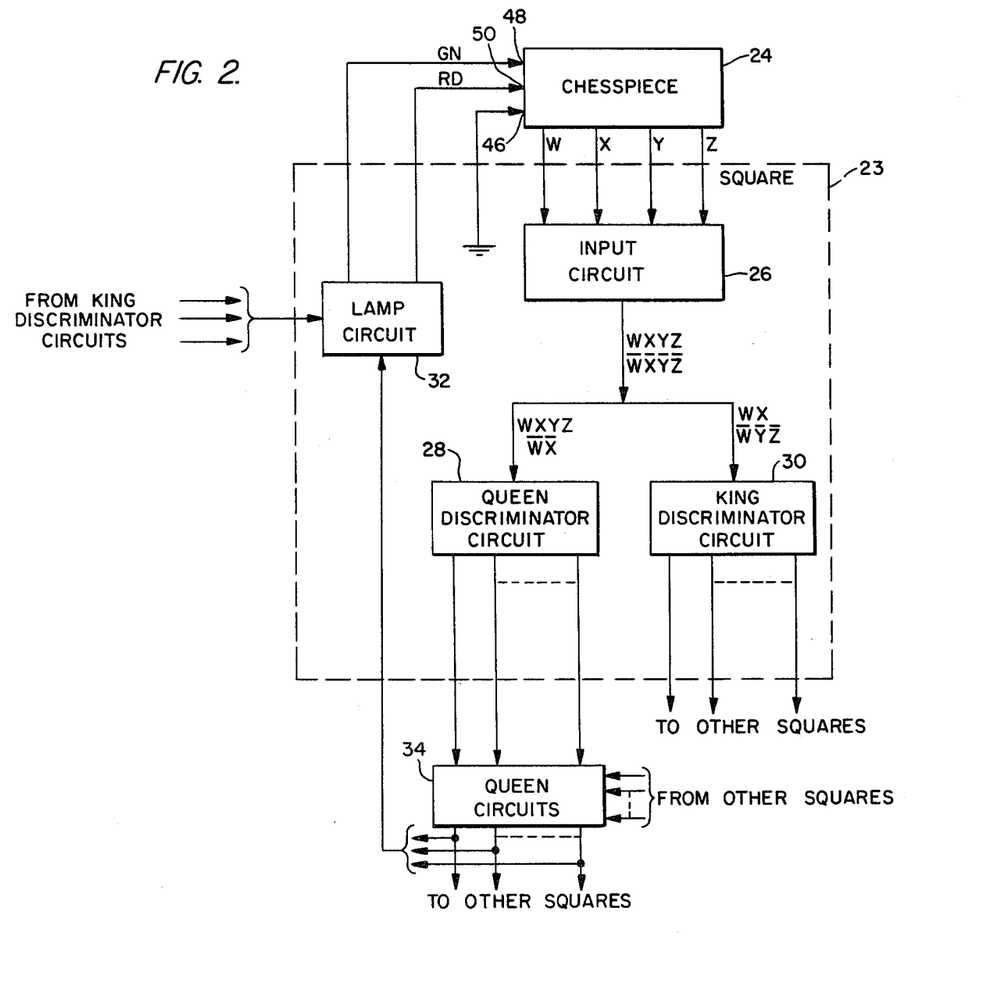
FIG. 2 is a block diagram illustrating the interconnection of various electrical circuits of the invention.

FIG. 2 is a block diagram which illustrates the various electronic circuits associated with each square 23 of the chessboard and the interconnections between the circuits. As shown, each square has associated with it an input circuit 26, a queen discriminator circuit 28, a king discriminator circuit 30 and a lamp circuit 32. These circuits comprise digital logic circuits which may be implemented with TTL 7400 series digital logic. (Preferred constructions will be described shortly). Input circuit 26 receives digital signals W, X, Y, and Z from a chesspiece 24 located on the square and outputs these signals and their complements (represented by the symbols $\overline{W}$, $\overline{X}$, $\overline{Y}$, and $\overline{Z}$) as "1" and "0" logic levels to the queen discriminator circuit 28 and to the king discriminator circuit 30. The chesspiece is encoded by the 1-0 pattern of signals W, X, Y, Z, as will be explained.

The king discriminator circuit responds to the fixed chesspieces, i.e., kings, pawns, and knights, and causes the appropriate squares which represent possible moves for the particular chesspiece detected to be illuminated. The queen discriminator circuit 28 responds to both the fixed and the positional chesspieces and outputs a plurality of signals, which are determined by the group and the type of the chesspiece located on the square, to a plurality of queen circuits 34. The queen circuits, which are associated with selected groups of squares as will be explained, also receive inputs from the queen discriminator circuits associated with certain other squares, and generate a plurality of outputs to a lamp circuit 32 of square 23 and to the lamp circuits of the other squares with which they are associated. The queen circuits respond to the group membership and to the type of the chesspieces located on the other squares with which they are associated, and generate output signals to the squares which represent possible moves of chesspiece 24, considering the locations of the other chesspieces.

As is also shown in FIG. 2, lamp circuit 32 generates outputs to chesspiece 24 which cause the chesspiece to be appropriately illuminated when it is in jeopardy and when it is covered. The various circuits and the chesspiece illustrated in FIG. 2 will now be described in detail.

Figure 3:
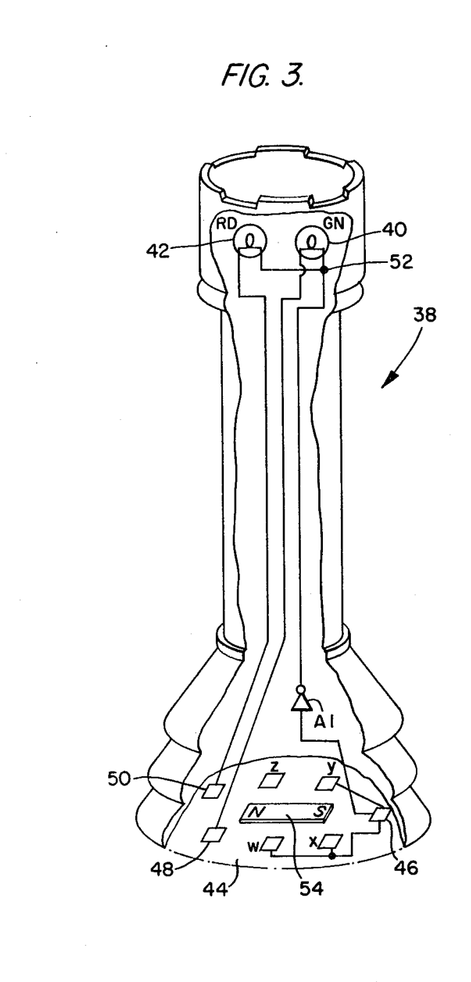
FIG. 3 is an enlarged perspective view, partially broken away, of a chesspiece in accordance with the invention, a rook being illustrated.

FIG. 3 illustrates the construction of a chesspiece (a rock) 38 in accordance with the invention. As is well known, the chesspiece may have an external configuration which identifies its particular type, and may be colored to identify its group membership. A pair of light sources 40, 42, each of a different color, may be disposed within the chesspiece 38. For example, light source 40 may be green and light source 42 may be red, as shown by the designations GN, and RD, respectively. Light sources 40, 42 may be miniature light bulbs, light emitting diodes (LED's), or liquid crystals, for example. Chesspiece 38 may be translucent with the light sources disposed within its interior, or the chesspiece may be opaque with a portion of each light source exposed on the chesspiece.

Figure 4:
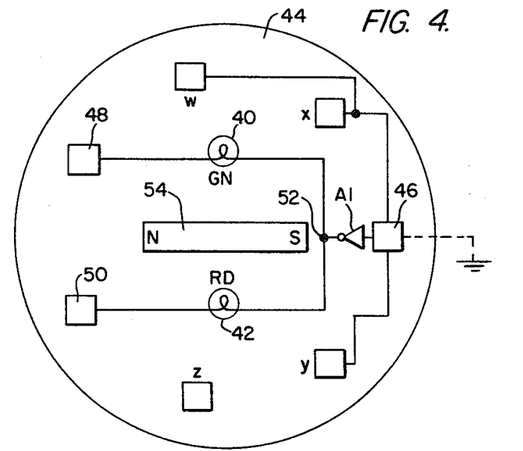
FIG. 4 is a combined schematic diagram and plan view of the chesspiece of FIG. 3 as viewed from the base of the chesspiece.

As shown in FIGS. 3 and 4, a plurality of electrical terminals is disposed in a predetermined pattern on the base 44 of the chesspiece. Four of the terminals are labeled w, x, y, and z and are used for outputting the encoding signals W, X, Y, and Z which identify the chesspiece. One terminal 46 is used for a ground connection and the remaining two terminals 48 and 50 are connected to one side of light sources 40 and 42, respectively. The other sides of the light sources are connected together at 52 on the output of an inverter amplifier A1, the input of which is connected to terminal 46.

Figure 5:
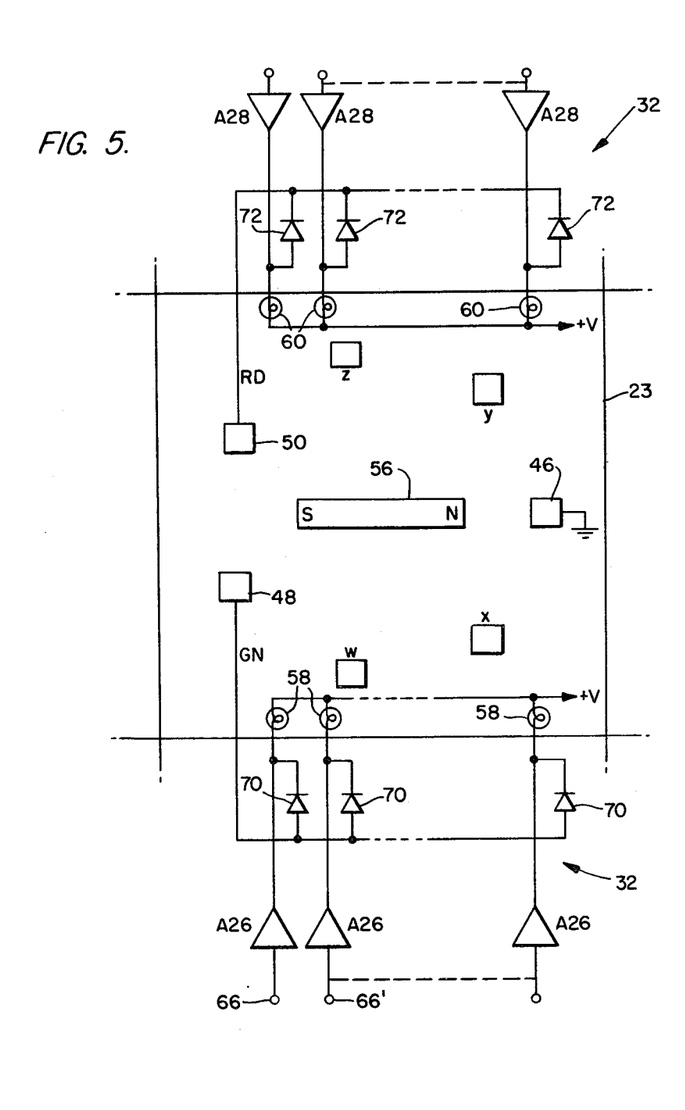
FIG. 5 is a combined schematic diagram and plan view of one square of a playing board in accordance with the invention.

Each square 23 of the chessboard has disposed thereon a pattern of terminals corresponding to the pattern of terminals on the base of the chesspieces, as shown in FIG. 5 which illustrates the terminal pattern of one square. When a chesspiece is placed on the square and properly oriented, the terminals on the base of the chesspiece contact the terminals on the square which are similarly designated. To ensure proper orientation of the chesspieces on the squares, each chesspiece may be formed with a permanent magnet 54, such as a bar magnet, in its base and each square may have located thereon another permanent magnet 56. As shown in FIGS. 3-5, the two magnets are located with respect to the terminal patterns on the base of the chesspiece and on the square so that the north (N) and south (S) poles of one magnet are reversed with respect to those of the other magnet. When the chesspiece is placed on the square, the attraction between the two magnets properly orients the chesspiece so that the terminals on its base are properly aligned with corresponding terminals on the square. This electrically connects the chesspiece to input circuit 26 via terminals w, x, y, and z, and to the lamp circuit 32 via terminals 48 and 50 (see FIG. 2). As shown in FIG. 5, terminal 46 on the square is grounded and provides a ground connection to the chesspiece.

As also shown in FIG. 5, disposed beneath the square are a plurality of light sources 58 and 60, light sources 58 being green and light sources 60 being red. The light sources, which also may be miniature bulbs, LED's, liquid crystals, etc., are adapted to be illuminated, in a manner to be described, to indicate that the square represents a possible move for one or more chesspieces. As will also be explained, when any one of the light sources 58 or 60 is illuminated, the correspondingly colored light source 40 or 42 in a chesspiece located on the square is also illuminated. For example, if the chesspiece is "green" and one of the red light sources 60 beneath the square is illuminated, light source 42 in the chesspiece will also be illuminated, indicating that the chesspiece is in jeopardy of being captured. Likewise, if one of the green light sources 58 beneath the square is illuminated, light source 40 in the chesspiece will also be illuminated, indicating that the chesspiece is covered or protected. Light sources 58 and 60 and their associated circuitry (illustrated in FIG. 5) comprise the lamp circuit 32 of the square.

Figure 6:
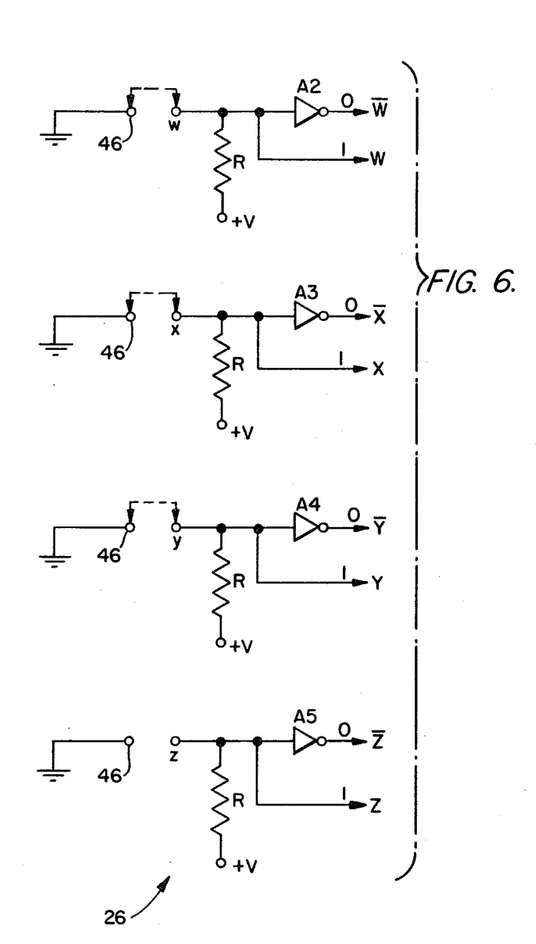
FIG. 6 is a schematic diagram of an input circuit in accordance with the invention.

FIG. 6 illustrates a preferred form of the input circuit 26 of the square. As shown, the input circuit comprises four separate inverting amplifiers A2, A3, A4, and A5 having their inputs connected to terminals w, x, y, and z, respectively, of the square. The input of each amplifier is connected to a positive voltage source (V) through a current-limiting resistor R and is also provided as an output from the circuit. The input circuit produces output signals W, X, Y, and Z and their complements $\overline{W}$, $\overline{X}$, $\overline{Y}$, and $\overline{Z}$.

As shown in FIG. 6, the output of amplifier A2 is W and its input is $\overline{W}$. Similarly, X and $\overline{X}$ are the input and the output, respectively, of A3; Y and $\overline{Y}$ are the input and the output, respectively, of A4; and Z and $\overline{Z}$ are the input and the output, respectively, of A5. The signals W, X, Y, and Z and their complements $\overline{W}$, $\overline{X}$, $\overline{Y}$, and $\overline{Z}$ are digital logic signals having either a logic 1 or a logic 0 level. The preferred form of the invention illustrated employs positive logic so that the logic level 0 corresponds approximately to ground, and logic level 1 corresponds approximately to the positive supply voltage V. It will be appreciated, however, that other types of logic may also be employed.

As previously mentioned, each chesspiece is encoded according to its group membership (i.e., color) and according to its type by a distinctive 1-0 logic pattern for signals W, X, Y, Z. The following Table 1 illustrates the preferred coding for the chesspieces.

TABLE 1

|  | Green | | | | Red | | | |
|---|---|---|---|---|---|---|---|---|
|  | W | X | Y | Z | W | X | Y | Z |
| King | 0 | 0 | 0 | 0 | 1 | 0 | 0 | 0 |
| Rook | 0 | 0 | 0 | 1 | 1 | 0 | 0 | 1 |
| Queen | 0 | 0 | 1 | 1 | 1 | 0 | 1 | 1 |
| Bishop | 0 | 0 | 1 | 0 | 1 | 0 | 1 | 0 |
| Pawn | 0 | 1 | 0 | 1 | 1 | 1 | 0 | 1 |

TABLE 1-continued

| | Green | | | | Red | | | |
|---|---|---|---|---|---|---|---|---|
| | W | X | Y | Z | W | X | Y | Z |
| Knight | 0 | 1 | 1 | 0 | 1 | 1 | 1 | 0 |

The encoding of each chesspiece is accomplished by connecting the terminals w, x, y, and z on the chespiece on which logic 0 signals are desired to terminal 46 so that these terminals are grounded when the chespiece is placed on a square. Terminals on which logic 1 signals are desired are left open. Thus, as shown in FIGS. 3 and 4, rook 38 has terminals w, x, and y connected to ground terminal 46 and terminal z is open. This produces the logic pattern 0001, which, as seen from Table I, corresponds to the green rook.

When the green rook is placed on a square, terminals w, x, and y of the input circuit (FIG. 6) will be grounded and terminal z will be open, as illustrated by the dotted lines in FIG. 6. Therefore, the input circuit will output the logic pattern 0001 for signals W, X, Y, and Z, and will output the logic pattern 1110 for signals $\overline{W}, \overline{X}, \overline{Y}$, and $\overline{Z}$. When all of its input terminals are open, which corresponds to the particular square associated with the input circuit being vacant, the output 1-0 logic pattern will be as indicated in FIG. 6. As shown in FIG. 2, predetermined ones of the output signals from the input circuit are supplied to the queen discriminator circuit 28 and to the king discriminator circuit 30.

Figure 7:
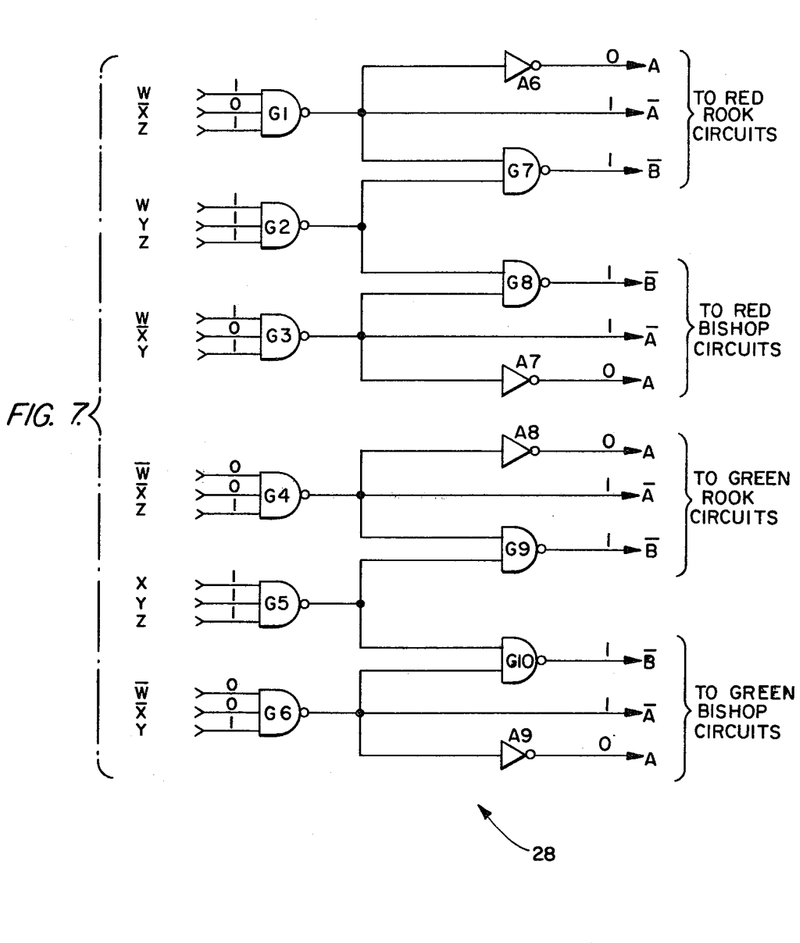
FIG. 7 is a schematic diagram of a queen discriminator circuit in accordance with the invention.

A preferred form of the queen discriminator circuit 28 of each square is illustrated in FIG. 7. As shown, the queen discriminator circuit comprises a plurality of NAND gates G1-G10, and a plurality of inverter amplifiers A6-A9, interconnected as illustrated in the figure. Each of gates G1-G6 receives as input signals a selected set of three of the output signals from the input circuit 26. A different selected set of signals is input to each of the gates G1-G6, as indicated in FIG. 7. The queen discriminator circuit produces four groups of output signals, each group comprising three signals designated, respectively, as A, $\overline{A}$, and $\overline{B}$. The four groups of output signals are supplied to certain ones of the queen circuits 34, which, as will be explained shortly, comprise red rook circuits, red bishop circuits, green rook circuits, and green bishop circuits. Each group of output signals from the queen discriminator circuit is appropriately designated in FIG. 7 according to the particular type of queen circuit to which it is supplied.

As shown in FIG. 7, output signals $\overline{A}$ of the four groups are derived, respectively, from the outputs of gates G1, G3, G4, and G6. The $\overline{A}$ signals from these gates are complemented by inverter amplifiers A6, A7, A8, and A9, respectively, and output as A signals in their respective groups. The $\overline{B}$ signals are derived from the outputs of gates G7-G10, which have as inputs the outputs of pairs of gates G1-G6. As shown, G7 receives as inputs the outputs of G1 and G2; G8 receives as inputs the outputs of G2 and G3; G9 receives as inputs the outputs of G4 and G5; and G10 receives as inputs the outputs of G5 and G6. In the static condition, i.e., when the square associated with the queen discriminator circuit is vacant, the logical values of the input and the output signals of the queen discriminator circuit are as indicated in the figure. As shown, the A output signals are all 0's, and the $\overline{A}$ and the $\overline{B}$ output signals are all 1's. When a chesspiece is placed on the square, the output signals of the queen discriminator circuit will change in a predetermined manner, as will be explained later.

Figure 8:
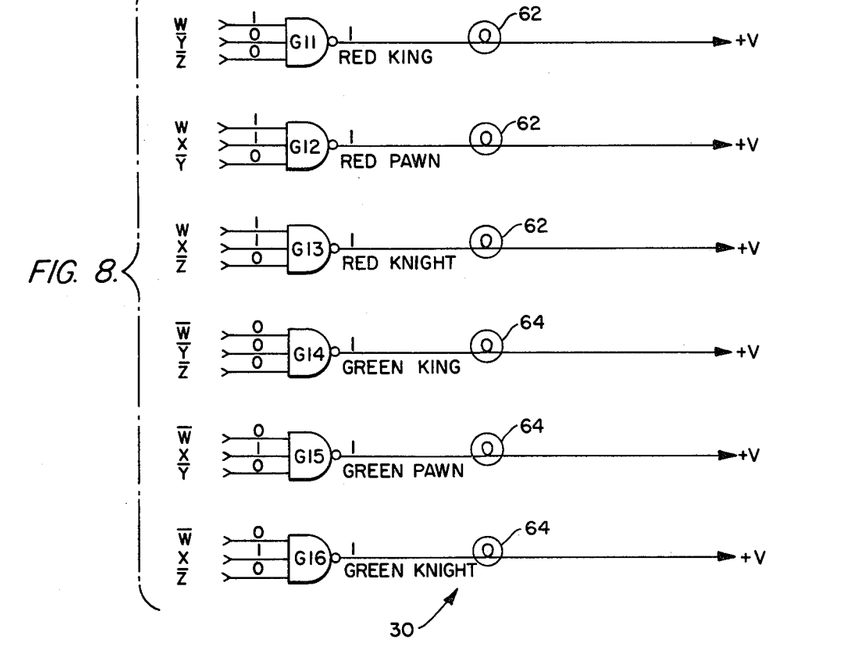
FIG. 8 is a schematic diagram of a king discriminator circuit in accordance with the invention.

FIG. 8 illustrates a preferred form of the king discriminator circuit 30 of the square. The circuit may comprise six NAND gates G11-G16. Each gate receives as input signals a selected set of three output signals from the input circuit 26. As shown in the figure, the set of input signals to each gate is different. Each of the gates G11-G16 responds to the presence of a different one of the fixed chesspieces. As indicated in the figure, gates G11, G12, and G13 are associated with the red king, the red pawn, and the red knight, respectively, while gates G14, G15, and G16 are associated with the green king, the green pawn, and the green knight, respectively. The outputs of gates G11-G13 are connected to the supply voltage V through red light sources 62, while the outputs of gates G14-G16 are connected to the supply voltage through green light sources 64.

When the square associated with the king discriminator circuit is vacant, the output of each of the gates G11-G16 will be a logic 1 and the light source connected to the output will be turned off, since the voltages on opposite sides of the light source will be the same. When a fixed chesspiece is placed on the square, its presence will be detected by the particular gate associated with the chesspiece, and the output of the gate will change to a logic 0, causing its associated light source to be turned on because of the potential difference across the light source. For example, when the green king, encoded as 0000 (see Table 1), is placed on the square, signals $\overline{W}, \overline{Y}$, and $\overline{Z}$ from input circuit 26 change from their static values of 000 to 111. This causes the output of gate G14 to go to 0, turning on its associated light source 64. However, the outputs of the other gates are unaffected by the presence of the green king on the square.

For simplicity, the output of each gate G11-G16 is shown in FIG. 8 connected to only a single light source 62 or 64. However, it should be understood that the output of each gate is connected to a plurality of light sources (in parallel), one being located beneath each square to which the particular chesspiece detected by the gate is capable of moving. For example, if the king discriminator circuit of FIG. 8 is associated with a corner square of the chessboard, the outputs of gates G11 and G14 for the red king and the green king, respectively, would each be connected to three light sources, one of the three being located beneath each of the three adjacent squares since these squares are the only possible moves for a king located on a corner square. However, if the king discriminator circuit is associated with a square in the center of the chessboard, for example, the outputs of gates G11 and G14 would each be connected to eight light sources, one being located under each of the eight adjacent squares. In this manner, when a fixed chesspiece is placed on a square, the king discriminator circuit of that square detects the group membership and the type of the chesspiece, and causes all of the squares to which the chesspiece may be moved to be illuminated.

If desired, the king discriminator circuit of FIG. 8 can be modified somewhat to reduce the number of light sources required. For example, since a king and a pawn can both advance one square, a single light source 62 or 64 driven by the outputs of both the king gate and the pawn gate (e.g., G11 and G12 or G14 and G15) can be used beneath an adjacent square to which both can move. Furthermore, as will be explained hereinafter, it is preferable to cause light sources 58 and 60 (FIG. 5) to perform the same functions as light sources 64 and 62, respectively, thereby allowing light sources 62 and 64 to be eliminated, by connecting the output of each of gates G11–G16 directly to the input terminals of appropriate lamp circuits 32.

As previously indicated, the outputs from the queen discriminator circuit 28 of each square are provided to a plurality of queen circuits 34. The outputs of the queen circuits drive the lamp circuits 32 and cause the squares which represent possible moves for the positional chesspieces to be appropriately illuminated. As was also previously mentioned, the movement patterns of the positional chesspieces are influenced by the locations of other chesspieces, both positional and fixed, on the chessboard. Therefore, in order to accurately reflect actual conditions of play, it is necessary to take into consideration the locations of blocking chesspieces and to appropriately illuminate squares which represent possible moves based upon these locations. The queen circuits 34 of the invention perform this function.

Figure 10A:
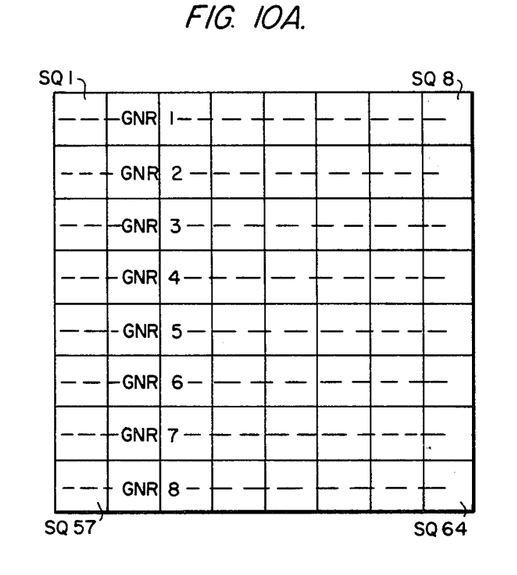
FIGS. 10A-D are diagrammatic views illustrating the placement of queen circuits with respect to the squares of a chessboard.
Figure 10B:
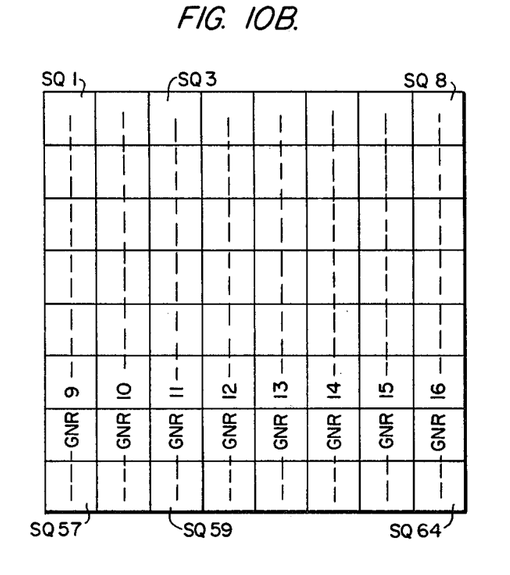

The queen circuits are classified as either rook circuits or bishop circuits, depending upon whether they are used to indicate rook-type moves or bishop-type moves. Accordingly, they are classified by their relative "placement" with respect to the squares of the chessboard, i.e., by the particular groups of squares from which they receive inputs and to which they provide outputs. The placements of the two types of circuits relative to the chessboard are illustrated in FIGS. 10A–D for the green rook circuits (FIGS. 10A and B) and for the green bishop circuits (FIGS. 10C and D), designated respectively as GNR and GNB. The rook circuits respond to the presence of the rooks and control the illumination of rows and columns of squares on the chessboard to indicate their possible moves. Accordingly, the rook circuits extend horizontally and vertically as illustrated in FIGS. 10A and B. As shown, there are eight horizontal rook circuits for the green rook, labeled GNR1–GNR8, one for each of the eight rows of squares on the chessboard, and there are eight vertical rook circuits for the green rook, labeled GNR9–GNR16, one for each of the eight columns. Each green rook circuit controls the green illumination of its particular row or column of squares. For example, green rook circuit 1 (GNR1) controls the green illumination of the first row of squares 1–8. Similarly, green rook circuit 9 (GNR9) controls the green illumination of the first column of squares extending between square 1 and square 57. The invention employs thirty-two rook circuits, eight horizontal and eight vertical circuits for the green rook, as shown in FIGS. 10A and B, and eight horizontal and eight vertical circuits (not illustrated) for the red rook. The red rook circuits parallel the functions of the green rook circuits, controlling the red illumination of rows and columns.

Figure 10C:
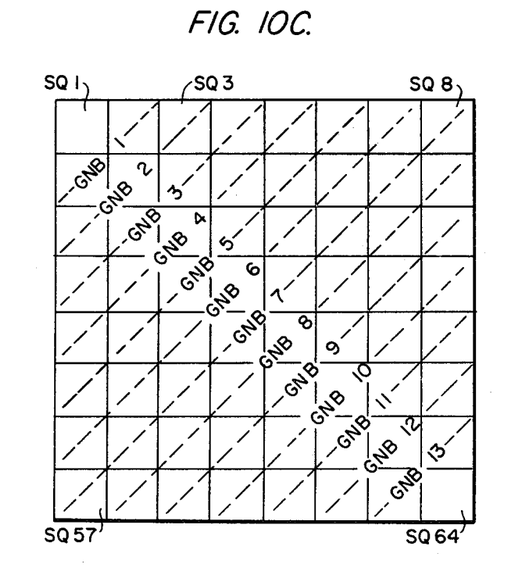
Figure 10D:
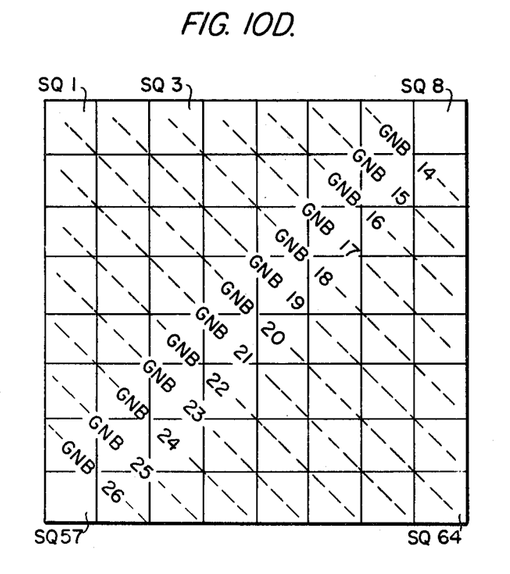

The bishop circuits are used for the diagonal movements of the bishops on the chessboard and control the illumination of squares located on diagonals, as illustrated in FIGS. 10C and D. As shown, there are twenty-six green bishop circuits. As with the rook circuits, there are also twenty-six red bishop circuits (not illustrated) which parallel the functions of the green bishop circuits for the red rook. Since a queen combines the movements of a rook and a bishop, the green rook and the green bishop circuits are used together for describing the movement of the green queen. Similarly, the red rook and the red bishop circuits are used together for describing the movement of the red queen.

It should be noted that the dotted lines in FIGS. 10A–D, representing the green rook and the green bishop circuits, are for the purpose of indicating the squares with which particular circuits are associated, and are not intended to represent the actual physical placements of the circuits with respect to the board. Also, it should be noted that the rook and the bishop circuits are independent and, in the form of the invention illustrated, control separate light sources beneath each square.

Figure 9:
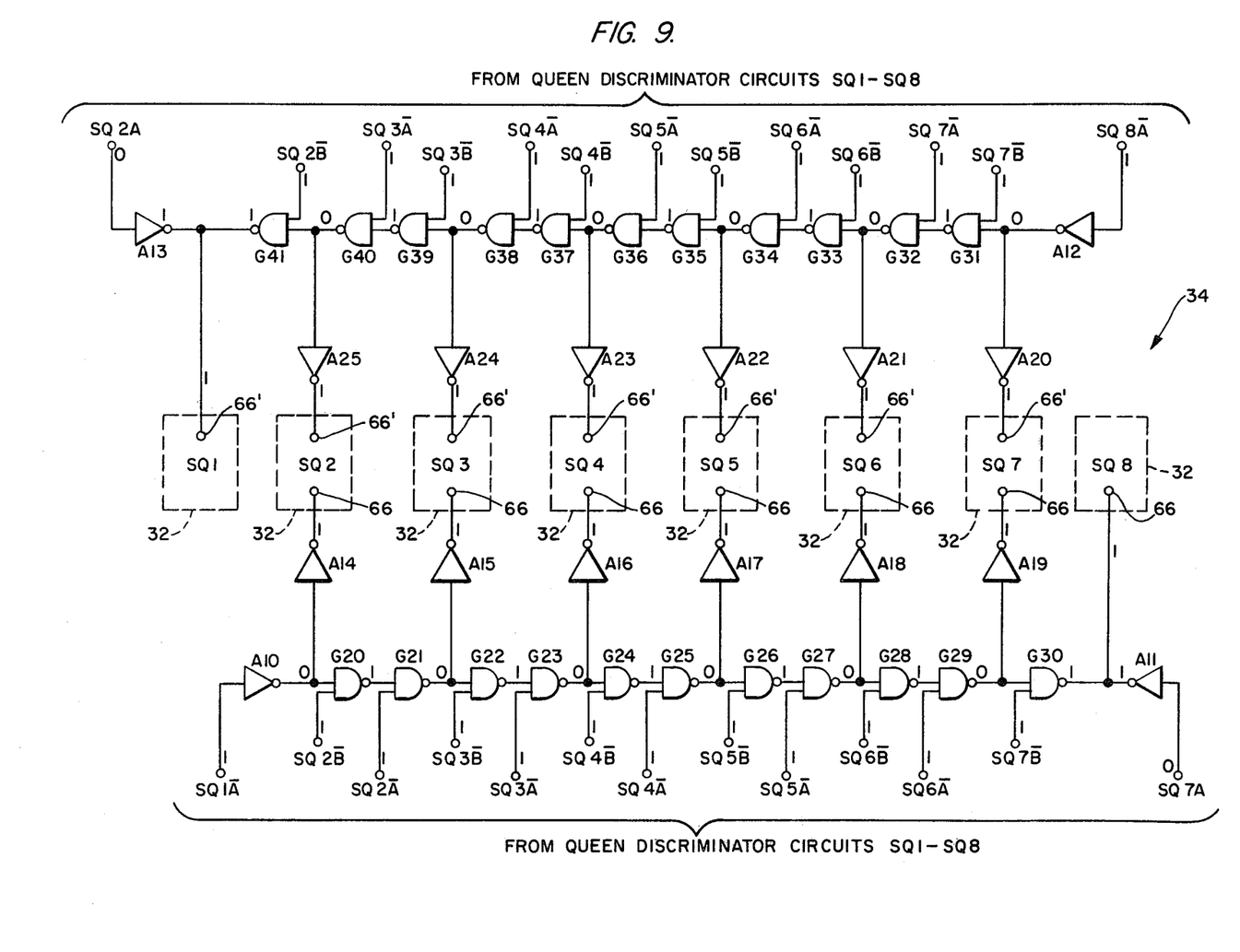
FIG. 9 is a schematic diagram of a queen circuit in accordance with the invention.

FIG. 9 illustrates a preferred embodiment of a queen circuit. For purposes of explanation, it will be assumed that the circuit of FIG. 9 is the green rook circuit which is associated with the first row (squares 1–8) of the chessboard, i.e., GNR1. The construction and operation of the other rook circuits, both red and green, are identical to the circuit of FIG. 9, although their inputs and their outputs will be associated with different groups of squares. Also, the construction and operation of the bishop circuits are similar to the rook circuit of FIG. 9. However, since the number of squares associated with the bishop circuits varies in accordance with the different diagonals, the number of inputs and outputs of the bishop circuits will also vary. The operation and the function of the bishop circuits, however, are the same.

As shown in FIG. 9, queen circuit 34 (in this instance green rook circuit 1) comprises a first series connection of two-input NAND gates G20–G30, and a second series connection of two-input NAND gates G31–G41, connected as illustrated. With the exception of the first gate G20 and G31 in each series connection, one input to each gate is supplied from the output of a preceding gate in their respective series connections. Gates G20 and G31 derive one of their inputs from the output of inverting amplifiers A10 and A12, respectively. The output of gate G30 and the output of an inverting amplifier A11 are connected together and the connected outputs are supplied to a terminal 66 of lamp circuit 32 of square 8 (SQ8). Similarly, the output of G41 is connected to the output of an inverting amplifier A13 and the connected outputs are supplied to a terminal 66' of lamp circuit 32 of square 1 (SQ1). The output from inverter amplifier A10 and the outputs from gates G21, G23, G25, G27, and G29 are supplied to inverter amplifiers A14–A19, as shown, the outputs of which are connected to terminals 66 of the lamp circuits 32 of squares SQ2–SQ7, respectively. Similarly, the output of inverter amplifier A12 and the outputs of gates G32, G34, G36, G38, and G40 in the second series connection are connected to inverter amplifiers A20–A25, respectively, and the outputs of the inverter amplifiers are supplied to terminals 66' of the lamp circuits 32 of squares SQ7–SQ1, respectively, as shown.

As indicated in FIG. 9, the inputs to inverter amplifiers A10–A13 and the second input to each of gates G20–G41 are supplied from the queen discriminator circuits of squares SQ1–SQ8. These inputs are the signals A, $\overline{A}$, and $\overline{B}$ of one of the four groups of such signals generated by each of the queen discriminator circuits in squares SQ1–SQ8. Since the queen circuit illustrated in FIG. 9 is a green rook circuit, the input signals to this circuit are the group of output signals from the queen discriminator circuits associated with each square SQ1–SQ8 which is labeled "To Green Rook Circuits" in FIG. 7. Similarly, red rook circuit 1, associated with squares SQ1-SQ8, would derive its inputs from the group of output signals of the queen discriminator circuits of squares SQ1-SQ8 which is labeled "To Red Rook Circuits" in FIG. 7.

The signals input to each of the gates G20-G41 of the queen circuit are either $\overline{A}$ or $\overline{B}$ signals. As shown in FIG. 9, the input signals to gates G20 and G21 are the $\overline{B}$ signal and the $\overline{A}$ signal, respectively, from the queen discriminator circuit of square 2, as indicated by the designations SQ2$\overline{B}$ and SQ2$\overline{A}$. Similarly, the inputs to gates G22 and G23 are the $\overline{B}$ signal and the $\overline{A}$ signal output from the queen discriminator circuit of square 2, labeled SQ3$\overline{B}$ and SQ3$\overline{A}$, respectively, The input signals to the remaining gates are as indicated in the figure. As shown, the input signal to inverter amplifier A10 is the $\overline{A}$ signal from the queen discriminator circuit of square 1, and the input to inverter amplifier A12 is the $\overline{A}$ signal from the queen discriminator circuit of square 8. The only components of the queen circuit of FIG. 9 which have as inputs the A signal are inverter amplifier A11, which derives its input from the queen discriminator circuit of square 7, and inverter amplifier A13, which derives its input from the queen discriminator circuit of square 2. The 1-0 logic levels indicated at various points in the circuit of FIG. 9 are the logic levels which are present for the static condition of the circuit, i.e., when none of the squares SQ1-SQ8 is occupied by a chesspiece. As previously described, under these conditions, the output signals A, $\overline{A}$ and $\overline{B}$ of the queen discriminator circuit (see FIG. 7) are 011, respectively. As can be seen in FIG. 9, with these input signals, the output of each of the inverter amplifiers A14-A25 supplied to the lamp circuits 32 (on terminals 66 or 66′) is a logic 1, and the outputs of A13 and G41 to terminal 66′ of square SQ1 and the outputs of A11 and G30 to terminal 66 of square SQ8 are also logic 1's. As will be explained shortly, when the output of an inverting amplifier A11, A13-A25 is 1, the light source to which the amplifier is connected (in the lamp circuits 32) will be turned off; and when the output is 0, the light source will be turned on. Thus, under static conditions, none of the green light sources 58 (FIG. 5) beneath squares SQ1-SQ8, which are controlled by green rook circuit 1, is illuminated.

To illustrate the operation of the queen circuit of FIG. 9, assume that the green rook is placed on square 3. The coding of the green rook (0001) causes the output logic pattern for each group of signals A, $\overline{A}$ and $\overline{B}$ of the queen discriminator circuit of square SQ3 to become 010 010 101 010 for the four groups of output signals (in order from top to bottom in FIG. 7). As seen, output signal $\overline{A}$ to the green rook circuit (SQ3$\overline{A}$) changes from a logic 1 to a logic 0. This input signal to gate G23 causes the outputs of each of gates G23-G31 to assume the opposite logic level from the static condition. Accordingly, the outputs of inverter amplifiers A16-A19 become logic 0's. The output to terminal 66 of SQ8 from the common connection of G30 and A11 also becomes 0. Simultaneously, the $\overline{A}$ signal input to gate G40 (SQ3$\overline{A}$) causes the outputs of gates G40 and G41 to reverse their logic levels. Accordingly, inverter amplifier A25 outputs a logic 0 to terminal 66′ of the lamp circuit of square 2, and gate G41 outputs a 0 logic level to terminal 66′ of the lamp circuit of square 1. It should be noted that since the input logic levels to A11 and A13 have not changed, their outputs want to remain at a logic 1 level but are pulled down to logic 0 when the outputs of G30 and G41 go to 0. Thus, it may be desirable, depending on the type of logic used, to insert diodes between the outputs of G30 and A11 and their common connection and between the outputs of G41 and A13 and their common connection.

Figure 11:
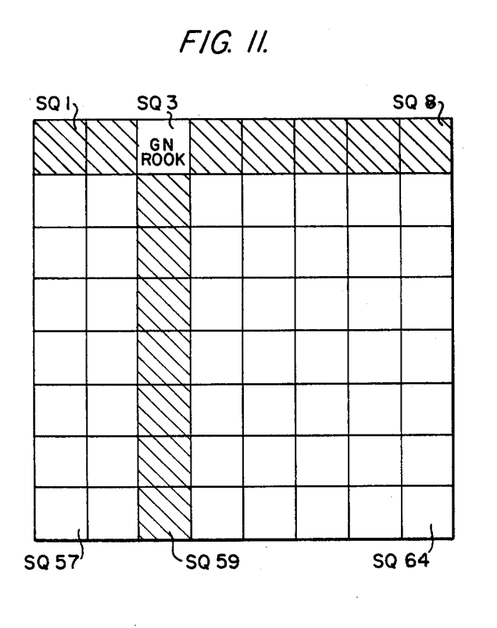
FIGS. 11 and 12 are similar diagrammatic views illustrating the operation of the invention.

The above-described action causes a green light source 58 (FIG. 5) beneath each of the squares in the first row except square SQ3 to be illuminated, as illustrated in FIG. 11. In addition, green rook circuit GNR11, which controls the green illumination of the third column of squares between squares SQ3 and SQ59 (see FIG. 10B) will detect the presence of the green rook on square SQ3, and, in a manner similar to that just described for GNR1, will cause the squares in the third column, except square SQ3, to be illuminated (assuming there are no blocking chesspieces in the column), as shown in FIG. 11. Thus, all of the squares where the green rook can move, cover, or attack will be illuminated green, as shown. Square SQ3 on which the green rook is located would not be illuminated, since the rook cannot move to, cover, or attack its own position.

To illustrate the action of the queen circuit of FIG. 9 when a blocking chesspiece is located on one of the squares controlled by the queen circuit, assume that, with the green rook located on square SQ3 and all squares in the first row except SQ3 illuminated green as just described, the red rook is placed on square SQ6. The coding of the red rook (1001) will cause the queen discriminator circuit (FIG. 7) of square SQ6 to output signals A, $\overline{A}$ and $\overline{B}$ to the green rook circuit as 010, respectively. Thus, input SQ6$\overline{B}$ to gate G28 changes from a logic 1 to a logic 0, and the output of the gate changes from a logic 0 to a logic 1. Input SQ6$\overline{A}$ to gate G29 remains a logic 1. Accordingly, the output of gate G29 changes back to a logic 0 (the static state output of the gate). This causes the outputs of inverter A19 and gate G30 to also revert to their static outputs, turning off the green light sources beneath the squares SQ7 and SQ8. The SQ6$\overline{B}$ input to gate G33 also changes from a logic 1 to a logic 0. However, the output of gate G33 is unaffected. Accordingly, the presence of the red rook on square SQ6 produces a blocking effect in the green rook circuit in the squares beyond SQ6, i.e., SQ7 and SQ8, which causes the green illumination of squares SQ7 and SQ8 to be turned off, indicating that the green rook cannot move to these squares and, thus, cannot exert any control over them. However, the green illumination of square SQ6, on which the red rook is located, is unaffected by the presence of the red rook, indicating that the green rook can move to this square and, in fact, can capture the red rook in doing so. This is illustrated in FIG. 12 by the appropriate hatching of the squares to indicate color.

To continue with the example, when the red rook is placed on square SQ6, the red rook circuit, which parallels the operation of green rook circuit GNR1, will respond to the presence of the red rook and cause the appropriate squares to which the red rook can move to be illuminated red, in the same manner previously described for the operation of the green rook circuit. Accordingly, as shown in FIG. 12, the red rook circuit will cause squares SQ7 and SQ8 to be illuminated red (as indicated by the hatching in the figure). In addition, the red rook circuit will also cause squares SQ3, SQ4, and SQ5 to be illuminated red, since these squares represent possible moves for the red rook. As shown in FIG. 12, squares SQ4 and SQ5 will be illuminated with both red and green light sources since either rook may move to either one of these squares. Square SQ3 will be illuminated only red, since the red rook can cover this square but the green rook cannot, as previously described. SQ1 and SQ2 will not be illuminated red since the green rook blocks the movement of the red rook to these squares. The green rook on SQ3 blocks on the red rook circuit in the same manner as the red rook blocks on the green rook circuit.

Figure 12:
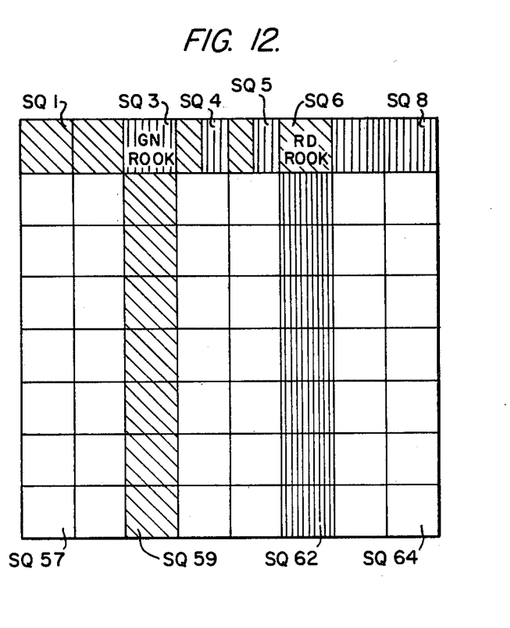

As is also shown in FIG. 12, a red rook circuit which parallels green rook circuit GNR14 (see FIG. 10B) will also cause the vertical column of squares between squares SQ6 and SQ62 to be illuminated red, since the red rook may also move to any of these squares. Thus, with only the green rook on SQ3 and the red rook on SQ6, the board will be illuminated as shown in FIG. 12.

If, instead of the red rook, any other chesspiece (fixed or positional) is placed on square SQ6, the blocking action produced in the green rook circuit GNR1 by that chesspiece will be identical to the blocking action just described for the red rook since the presence of any chesspiece on square SQ6 will prevent the green rook from moving to squares SQ7 and SQ8. This can be easily verified by using the encoding given in Table 1 for the various chesspieces and working through the logic in the manner just described.

If the green queen is placed on square SQ3 instead, the green rook circuits GNR1 (for the first row) and GNR11 (for the third column) will function in the identical manner to that just described, since the queen can move either horizontally or vertically. In addition, since the queen can also move diagonally, green bishop circuits GNB2 and GNB18 which control the two diagonals that intersect SQ3, as shown in FIGS. 10C and D, would also respond to the presence of the green queen on square SQ3, causing the squares on these two diagonals to be illuminated green. Another chesspiece located on either of these diagonals would produce a blocking action in the corresponding bishop circuit in the same manner as just described for the rook circuit. Thus, it can be seen that the queen circuits accurately indicate the possible moves for the positional chesspieces, by taking into consideration the locations of other chesspieces on the board.

As previously mentioned, in addition to indicating the available moves for each of the chesspieces, both fixed and positional, the invention also provides a visual indication to the players of the jeopardy in which a chesspiece is placed by virtue of its being located on a square to which an opposing piece can move, and the cover afforded to the chesspiece by virtue of its being located on a square to which a friendly piece can move. The manner in which this is accomplished will now be described.

As previously described, located beneath each square 23 is a lamp circuit 32 comprising a plurality of green light sources 58 and a plurality of red light sources 60. As shown in FIG. 5, one side of the light sources of each group is connected to the supply voltage (V), and the other side of the light sources of the group is connected to the output of a driver amplifier, A26 for green light sources 58 and A28 for red light sources 60. As previously described, each queen circuit provides two outputs (66, 66') to the light sources of the group having the same color as the queen circuit (i.e., red or green) beneath each square 23 which is associated with the queen circuit. The two outputs (66, 66') from the queen circuit are input to two of the driver amplifiers A26 or A28 at the square. Driver amplifiers A26 receive the outputs from the green queen circuits for controlling the green light sources 58, while driver amplifiers A28 receive the outputs from the red queen circuits for controlling the red light sources 60. When the input signal on any driver amplifier is a logic 0, the light source connected to the output of that driver amplifier will be turned on since there will be a potential difference across the light source. In accordance with the invention, when a chesspiece is located on a square and any of the light sources beneath the square is turned on, the correspondingly colored light source 40 or 42 in the chesspiece (FIGS. 3 and 4) will be turned on also to indicate that the chesspiece is in jeopardy or is covered. This is accomplished in the following manner.

As previously described in connection with FIGS. 3 and 4, the green light source 40 in the chesspiece is connected to terminal 48 on the base of the chesspiece, and the red light source 42 is connected to terminal 50. As shown in FIG. 5, terminal 48 on the square is connected by a plurality of diodes 70 to each of the green light sources 58 at the output of its corresponding driver amplifier A26. Similarly, terminal 50 is connected to each of the red light sources 60 at the output of its corresponding driver A28 by a plurality of diodes 72. When the output of any driver amplifier A26 or A28 assumes a logic 0 output level to turn on its corresponding light source, the diode connected to that output will be forward biased and current will flow from amplifier A1 in the chesspiece (FIGS. 3 and 4) through the terminal 48 or 50 connected to the forward biased diode. This will cause the light source 40, 42, connected to terminal 48, 50 to be illuminated. Thus, when a green chesspiece is located on a square beneath which one of the green light sources 58 is illuminated, the green light source 40 in the chesspiece will also be illuminated, indicating that the chesspiece is covered. If one of the red light sources 60 is illuminated beneath the square, the red light source 42 within the chesspiece will be illuminated, indicating that the chesspiece is in jeopardy of being captured. If the square is illuminated with both red and green light sources, both the red and green light sources in the chesspiece will also be illuminated, indicating that although the chesspiece is in jeopardy, it is also covered. In this manner, the players can tell at a glance the status of each of the chesspieces on the board.

In order that the chesspieces be illuminated in accordance with the jeopardy or the cover afforded to them by the fixed chesspieces, it is desirable that the outputs of the king discriminator circuits (FIG. 8) which drive the red light sources 62 beneath each square be connected to terminal 50 of the square in the same manner as red light sources 60, and that green light sources 64 be connected to terminal 48 in the same manner as green light sources 58. Accordingly, the outputs of gates G11–G16 of the king discriminator circuit may be connected directly to appropriate driver amplifiers A26, A28 of the lamp circuits 32 and light sources 62 and 64 may be eliminated. Thus, whenever a light source controlled by the king discriminator circuit is illuminated, the correspondingly colored light source in a chesspiece on the square will also be illuminated.

It is also possible to reduce the number of light sources beneath each square. As previously mentioned in connection with the description of the king discriminator circuit of FIG. 8, certain of the light sources 62 and 64 associated with the kings and the pawns perform duplicate functions and may be eliminated by using a single light source beneath the squares to which a king and a pawn can both move. If the king discriminator circuit outputs are connected to the driver amplifiers A26, A28, as just described, it is still possible to eliminate the duplicate light sources by driving one amplifier A26, A28 with the outputs from more than one gate G11–G16.

Since, in the preferred form of the invention illustrated, each chesspiece on the board controls a separate light source under each square which represents a possible move for that chesspiece, the amount of jeopardy in which each chesspiece is placed and the amount of protection afforded to the chesspiece are indicated by the intensity of the illumination of the square on which the chesspiece is located, i.e., the number of light sources of each color which are illuminated beneath the square. This is an advantage of the preferred form of the invention, since the intensity of the attack or the cover afforded a chesspiece is of interest to the players to assist in their decision making. In addition, if desired, power may be supplied to the red light sources and to the green light sources from separate power circuits which incorporate ammeters. The amount of current flowing in a particular circuit is a function of the number of light sources in that circuit which are illuminated. Therefore, the relative magnitudes of the current flow in the two circuits would provide information as to the relative advantage held by one player over the other.

Moreover, if desired, instead of using a plurality of light sources beneath each square, each square may have a single light source of each color, and well-known logic may be employed to turn on the appropriate light source whenever that square represents a possible move for any chesspiece. The intensity of cover or attack could easily be determined by employing an integrated circuit microprocessor for counting the number of "on" signals generated by the king discriminator circuits and the queen circuits for each color.

While a preferred embodiment of the invention has been shown and described, it will be apparent to those skilled in the art that changes can be made in this embodiment without departing from the principles and spirit of the invention, the scope of which is defined in the appended claims.

What is claimed is:

1. An electronic game comprising a playing board defining a plurality of playing positions, a plurality of playing pieces, at least some of which are of different types, each piece being movable between playing positions in accordance with a predetermined pattern dependent upon its type, said predetermined pattern being influenced by the locations of other ones of said pieces, means for encoding each piece according to its type, means at each position responsive to the encoding means for detecting the presence and type of a piece located at that position, and means responsive to the detecting means for illuminating each position on the board to which such piece can be moved, the illuminating means being responsive to the locations of other ones of said pieces.

2. An electronic game comprising a playing board defining a plurality of playing positions, a plurality of playing pieces divided into groups of opposing pieces representing opposing players, each piece being movable between playing positions in accordance with a predetermined pattern, said predetermined pattern being influenced by the locations of other ones of said pieces, means for encoding each piece according to its group membership, means at each position responsive to the encoding means for detecting the presence of a piece located at that position and the group membership of the piece, and means responsive to the detecting means for illuminating each position on the board to which such piece can be moved, the illuminating means being responsive to the locations of other ones of said pieces.

3. The game of claim 1, wherein the illuminating means includes means for varying the intensity of said illumination in accordance with the number of other pieces that can be moved to said position.

4. An electronic game comprising a playing board defining a plurality of playing positions, a plurality of playing pieces divided into groups of opposing pieces representing opposing players, each piece being movable between playing positions in accordance with a predetermined pattern and capable of capturing an opposing piece located on a position to which such piece is moved, said predetermined pattern being influenced by the locations of other ones of said pieces, means for encoding each piece according to its group membership, means at each position responsive to the encoding means for detecting the presence of and the group membership of a piece located at that position, and means responsive to the detecting means for illuminating each piece when it is located at a position to which an opposing piece can be moved.

5. The game of claim 4, wherein the illuminating means further comprises means for illuminating each piece according to the protection afforded said piece due to the location of another piece having the same group membership.

6. The game of claim 2 or 4, wherein the means for illuminating comprises means for illuminating with different colors representative of the different groups.

7. The game of claim 2 or 4, wherein each group of playing pieces comprises pieces of different types, each type being capable of moving in a different characteristic pattern.

8. The game of claim 7, wherein the game is chess.

9. The game of claim 7, wherein the encoding means further includes means for encoding each piece according to its type, and the detecting means includes means for detecting the type of each piece.

10. The game of claim 1 or 4 further comprising means for automatically orienting each piece in a predetermined manner with respect to the position on which it is located.

11. The game of claim 10, wherein the orienting means includes a first magnet located at each position and a second magnet located in the base of each piece.

12. The game of claim 1 or 4, wherein the base each piece includes a plurality of electrical terminals and each position has a plurality of corresponding electrical terminals adapted to contact the terminals in the base of the piece when the piece is located on a position.

13. The game of claim 12, wherein the encoding means includes means within each piece for shorting together certain ones of the terminals in the base of the piece.

14. The game of claim 13, wherein the detecting means comprises electrical circuit means having inputs connected to predetermined ones of the terminals at said positions, said predetermined ones of terminals including terminals corresponding to the shorted terminals in the base of the piece.

15. The game of claim 14, wherein the electrical circuit means has outputs connected to said illumination means.

16. The game of claim 15, wherein the playing pieces comprise pieces of different types, each piece being encoded according to its type and each type being capable of moving in a different characteristic pattern, and wherein said electrical circuit means comprises first circuit means responsive to the encoding of a piece for producing encoding signals, and second and third circuit means connected to the first circuit means for receiving the encoding signals, the second circuit means being responsive to a first plurality of playing piece types for controlling the illumination of the positions to which the pieces of the first plurality can move, and the third circuit means being responsive to a second plurality of playing piece types for controlling the illumination of the positions to which the pieces of the second plurality can move.

17. In an electronic game of the type having a playing board defining a plurality of playing positions, each adapted to receive one of a plurality of playing pieces, the playing pieces being divided into groups representing opposing players, each piece being encoded in accordance with its group membership and being capable of moving in accordance with a predetermined pattern between said positions, said predetermined pattern being influenced by the locations on said positions of other pieces, the playing board comprising first electrical circuit means for detecting the positions on the board which are occupied by a piece and for identifying the group membership of the piece located at each occupied position, second electrical circuit means responsive to the first electrical circuit means for determining the possible moves that each piece can make, considering the locations of the other pieces, and means for indicating said possible moves.

18. The game of claim 17, wherein the indicating means comprises means for illuminating the positions which represents possible moves of each piece, the positions being illuminated in different colors corresponding to the different groups.

19. The game of claim 18, wherein the playing board is translucent and the illuminating means includes light emitting means located beneath each playing position.

20. The game of claim 17, wherein said first and second electrical circuit means comprise digital circuits.

21. An electronic game comprising a playing piece and a playing board defining a plurality of playing positions to which the playing piece may be moved, first magnetic means located at each of the playing positions, second magnetic means located in the base of the playing piece, a first set of electrical terminals disposed on the board at each position, and a second set of electrical terminals disposed on the base of the playing piece, the first and second magnetic means being effective to orient the playing piece at each position to which the playing piece is moved such that electrical contact is established between predetermined ones of the terminals of said first and second sets.

22. The game of claim 21, wherein said first and second magnetic means comprise permanent bar magnets.

23. The game of claim 21, wherein the playing piece further comprises illumination means disposed therein, the illumination means being connected to certain ones of said second set of terminals and adapted to be illuminated by electrical signals on corresponding ones of the first set of terminals.

24. The game of claim 21, wherein the playing piece further comprises means for shorting together predetermined terminals of said second set of terminals in order to identify the playing piece.

25. The game of claim 21, wherein the playing board comprises means associated with each playing position for detecting the location of the playing piece, the playing piece being capable of moving between playing positions in accordance with a predetermined pattern, and means responsive to said detecting means for illuminating playing positions on the board which represent possible moves of said playing piece.

* * * * *